US012620668B2

(12) United States Patent
Huang

(10) Patent No.: US 12,620,668 B2
(45) Date of Patent: May 5, 2026

(54) BATTERY

(71) Applicant: NINGDE AMPEREX TECHNOLOGY LIMITED, Ningde City (CN)

(72) Inventor: Denglong Huang, Dongguan City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 727 days.

(21) Appl. No.: 18/078,192

(22) Filed: Dec. 9, 2022

(65) Prior Publication Data

US 2023/0103699 A1 Apr. 6, 2023

Related U.S. Application Data

(63) Continuation of application No. PCT/CN2020/095937, filed on Jun. 12, 2020.

(51) Int. Cl.
| | |
|---|---|
| *H01M 50/284* | (2021.01) |
| *H01M 10/42* | (2006.01) |
| *H01M 50/204* | (2021.01) |
| *H01M 50/271* | (2021.01) |
| *H01M 50/543* | (2021.01) |

(52) U.S. Cl.
CPC ....... *H01M 50/284* (2021.01); *H01M 10/425* (2013.01); *H01M 50/204* (2021.01); *H01M 50/271* (2021.01); *H01M 50/543* (2021.01)

(58) Field of Classification Search
CPC ............. H01M 10/425; H01M 50/271; H01M 50/204; H01M 50/543; H01M 50/284
See application file for complete search history.

(56) References Cited

U.S. PATENT DOCUMENTS

2015/0249237 A1* 9/2015 Naito ..................... H01R 12/58
                                                       429/7
2017/0187014 A1 6/2017 Rank et al.

FOREIGN PATENT DOCUMENTS

CN          106471642 A      3/2017
CN          206003858 U      3/2017
              (Continued)

OTHER PUBLICATIONS

Machine translation CN206003858U (Year: 2025).*
              (Continued)

*Primary Examiner* — Brian R Ohara
*Assistant Examiner* — M. T. Leonard
(74) *Attorney, Agent, or Firm* — WHDA, LLP

(57) ABSTRACT

A battery includes a shell, a cell module, and a circuit board. The shell includes a first housing, a second housing, and a third housing. The cell module includes a plurality of stacked cells. The circuit board is electrically connected to the cell module. The second housing and the first housing close in to form a first cavity. The first cavity is configured to accommodate the cell module. The third housing and the second housing close in to form a second cavity. The second cavity is configured to accommodate the circuit board. Along a stacking direction of the cells, the second housing isolates the cell module from the circuit board. The cell module and the circuit board are disposed in the first cavity and the second cavity respectively. The second housing isolates the circuit board from the cells in the stacking direction of the cells.

18 Claims, 12 Drawing Sheets

(56)  References Cited

FOREIGN PATENT DOCUMENTS

| CN | 210129540 U | 3/2020 |
| CN | 210379349 U | 4/2020 |
| WO | 2017/076778 A1 | 5/2017 |

OTHER PUBLICATIONS

International Search Report dated Mar. 10, 2021, issued in counterpart International Application No. PCT/CN2020/095937, with English Translation. (7 pages).

* cited by examiner

135

151

BATTERY

CROSS REFERENCE TO THE RELATED APPLICATIONS

The present application is a continuation application of PCT application PCT/CN2020/095937, filed on 12 Jun. 2020, the disclosure of which is hereby incorporated by reference in its entirety.

TECHNICAL FIELD

This application relates to a battery.

BACKGROUND

Nowadays there is an increasing tendency to charge electric tools such as a vacuum cleaner and a garden tool by using a lithium battery. However, a space available in the tool for installing a battery is limited. Cells and a circuit board in the battery dissipate heat in a limited space and affect each other. Consequently, the operating performance of the battery is deteriorated and the battery is at risk of burning and explosion.

SUMMARY

In view of the foregoing, it is necessary to provide a battery to solve the foregoing problems.

This application discloses a battery. The battery includes a shell, a cell module, and a circuit board. The shell includes a first housing, a second housing, and a third housing. The cell module includes a plurality of stacked cells. The circuit board is electrically connected to the cell module. The second housing and the first housing close in to form a first cavity. The first cavity is configured to accommodate the cell module. The third housing and the second housing close in to form a second cavity. The second cavity is configured to accommodate the circuit board. Along a stacking direction of the cells, the second housing isolates the cell module from the circuit board.

According to some embodiments of this application, the isolation is non-closed isolation. The battery includes a collecting piece located in the second cavity. One end of the collecting piece is connected to the circuit board. The other end is connected to the cell module.

According to some embodiments of this application, the shell further includes a channel One end of the collecting piece is connected to the cell module through the channel.

According to some embodiments of this application, the battery includes a charge-discharge port. The charge-discharge port includes a terminal connected to the circuit board. The first housing is provided with a third cavity. The third cavity is isolated from the first cavity and communicates with the second cavity, and the terminal is accommodated in the third cavity.

According to some embodiments of this application, the terminal includes a first terminal and two second terminals. The first terminal is located between the two second terminals. Two partition plates are disposed in the third cavity. The partition plates are located between the first terminal and one of the two second terminals.

According to some embodiments of this application, the battery includes a fastener. The first housing includes a protruding portion disposed between the two partition plates. A third via hole and a fourth via hole that fit with the protruding portion are disposed on the third housing and the circuit board respectively. The fastener passes through the third via hole and the fourth via hole consecutively and is connected and fixed to the protruding portion.

According to some embodiments of this application, the first terminal includes a main body, three pin portions, and two receptacle portions. The main body is a U-shaped plate structure includes three lateral faces. The three pin portions are disposed on the three lateral faces of the main body respectively, and are configured to connect onto the circuit board separately. The two receptacle portions are disposed on two opposite lateral faces of the main body respectively, and extend toward each other to at least partly abut against each other.

According to some embodiments of this application, the cell module further includes two tabs of opposite polarities and disposed on a same side of the cells. A first via hole and a second via hole are disposed on a sidewall of the first housing, where the sidewall is located on a side on which the tabs are disposed. The battery further includes a first connecting piece and a second connecting piece. One end of the first connecting piece is connected and fixed to the circuit board. The other end is connected to the cell module through the first via hole. One end of the second connecting piece is connected and fixed to the circuit board, and the other end is connected to the cell module through the second via hole.

According to some embodiments of this application, the battery further includes a adapter plate located in the first cavity. The two tabs are welded to the adapter plate separately. The first connecting piece is connected to the adapter plate through the first via hole. The second connecting piece is connected to the adapter plate through the second via hole.

According to some embodiments of this application, the adapter plate and the charge-discharge port are disposed on two opposite sides of the cell module.

According to some embodiments of this application, the battery further includes a protective piece. A groove is provided on the adapter plate. Two ends of the protective piece are connected to two sides of the groove on the adapter plate respectively, and are serially connected on a loop of electrical connection of the first connecting piece, the two tabs, and the second connecting piece.

According to some embodiments of this application, the first housing, the second housing, and the third housing are arranged along the stacking direction of the cells.

According to some embodiments of this application, the housing further includes an end cover. The end cover is located on a side of the cell module, the side on which the tabs are disposed. The end cover forms a sleeve outside the first housing, the second housing, and the third housing.

According to some embodiments of this application, the first housing includes a first sidewall. The second housing includes a second sidewall. A first fixing structure is disposed between the first sidewall and the second sidewall. The first fixing structure includes a guiding groove, a guiding portion, a snap buckle, and a buckle hole. The guiding portion is configured to be embedded into the guiding groove. The guiding groove is disposed on one of the first sidewall or the second sidewall, and the guiding portion is disposed on the other of the first sidewall or the second sidewall. The snap buckle is configured to be snap-fitted in the buckle hole. The snap buckle is disposed on one of the guiding portion or a wall of the guiding groove, and the buckle hole is disposed on the other of the guiding portion or the wall of the guiding groove.

In the foregoing battery, the cell module and the circuit board are disposed in the first cavity and the second cavity respectively. The second housing isolates the circuit board from the cell module in the stacking direction of the cells, thereby thermally separating the first cavity from the second cavity effectively, and reducing mutual interference between the cell module and the circuit board caused by heat generated during operation.

REFERENCE NUMERALS

Figure 1:
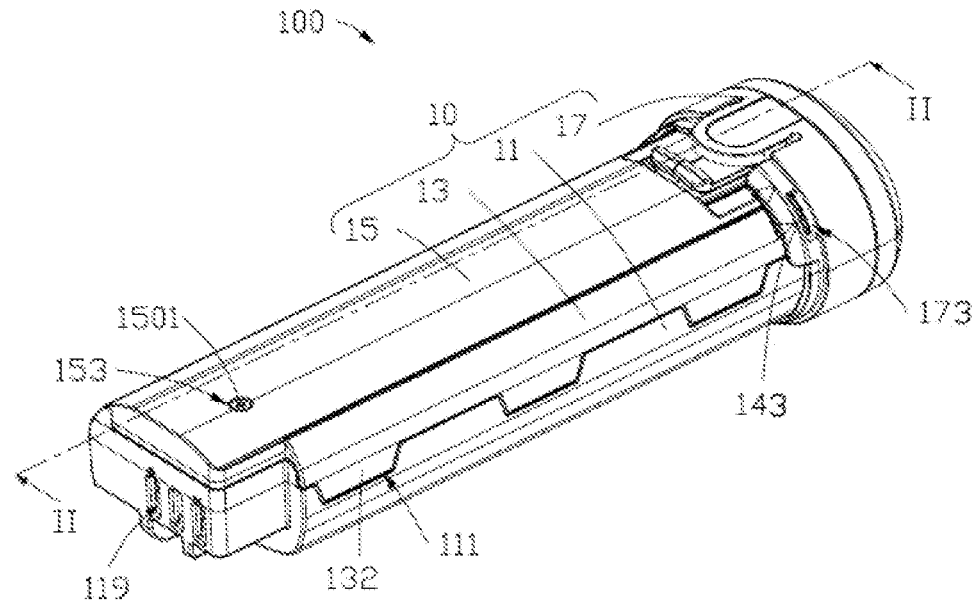
FIG. 1 is a schematic structural diagram of a battery according to an embodiment of this application.

Battery 100
Shell 10
First cavity 101
Second cavity 103
Third cavity 105
First housing 11
First sidewall 1101
Guiding groove 111, 111a
Snap hole 112, 112a
Slot 113
Connecting hole 114
Protruding portion 115
First via hole 116
Second via hole 117
First snap-fit portion 118
Opening 119
Partition plate 120
Second housing 13
Second sidewall 1301
Pillar 131
Guiding portion 132, 132a
Snap buckle 133, 133a
Clasping portion 134
Sliding slot 135
First press-down portion 136
Accommodation groove 137
Second press-down portion 138
Cable trough 139
Third press-down portion 140
Channel 141
Heat dissipation slot 142

Second snap-fit portion 143
Third housing 15
Sliding portion 151
Third via hole 153
Fastener 1501
End cover 17
First snap hole 171
Second snap hole 173
Gap 1001
Cell module 20
First side 201
Second side 203
Cell 25
Foam 27
Circuit board 30
Electronic component 31
Hole structure 33
Fourth via hole 35
First connecting piece 40
Second connecting piece 50
Adapter plate 60
Groove 61
Protective piece 70
Collecting piece 80
Wire harness 81
Charge-discharge port 90
First terminal 91
Main body 911
Lateral face 9111
Pin portion 913
Receptacle portion 915
Second terminal 93
Insulation strip 110

This application is further described below with reference to the following specific embodiments and the foregoing drawings.

DETAILED DESCRIPTION

The following describes some embodiments of this application with reference to the drawings hereof. Evidently, the described embodiments are merely a part of but not all of the embodiments of this application.

Unless otherwise defined, all technical and scientific terms used herein have the same meanings as usually understood by a person skilled in the technical field of this application. The terms used in the specification of this application herein are merely intended for describing specific embodiments but are not intended to limit this application.

Some embodiments of this application disclose a battery. The battery includes a shell, a cell module, and a circuit board. The shell includes a first housing, a second housing, and a third housing. The cell module includes a plurality of stacked cells. The circuit board is electrically connected to the cell module. The second housing and the first housing close in to form a first cavity. The first cavity is configured to accommodate the cell module. The third housing and the second housing close in to form a second cavity. The second cavity is configured to accommodate the circuit board. Along a stacking direction of the cells, the second housing isolates the cell module from the circuit board.

In the foregoing battery, the cell module and the circuit board are disposed in the first cavity and the second cavity respectively. The second housing isolates the circuit board from the cell module in the stacking direction of the cells, thereby thermally separating the first cavity from the second cavity effectively, and reducing mutual interference between the cell module and the circuit board caused by heat generated during operation.

The following describes some embodiments of this application in detail with reference to drawings. To the extent that no conflict occurs, the following embodiments and the features in the embodiments may be combined with each other.

Figure 2:
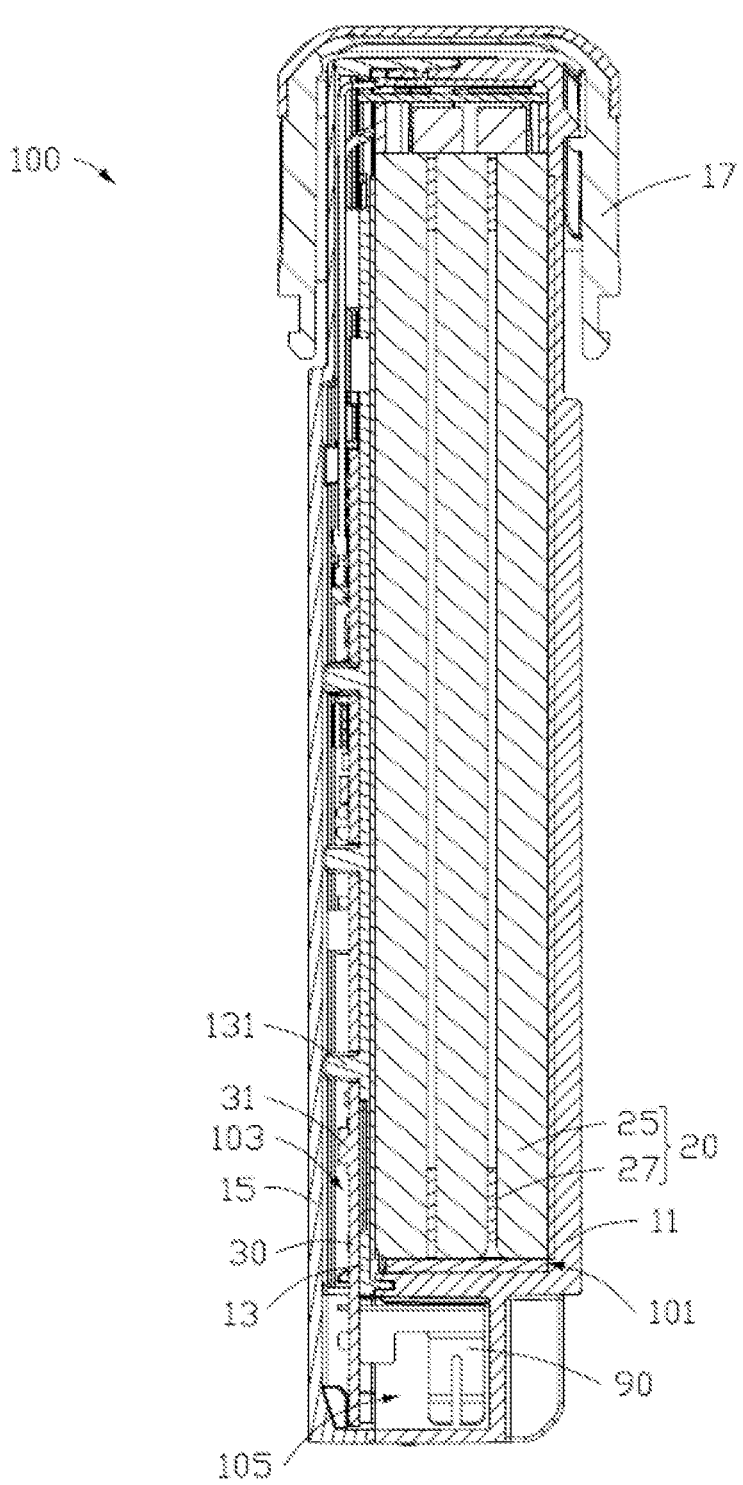
FIG. 2 is a schematic structural sectional view of the battery shown in FIG. 1 sectioned along an II-II line.
Figure 3:
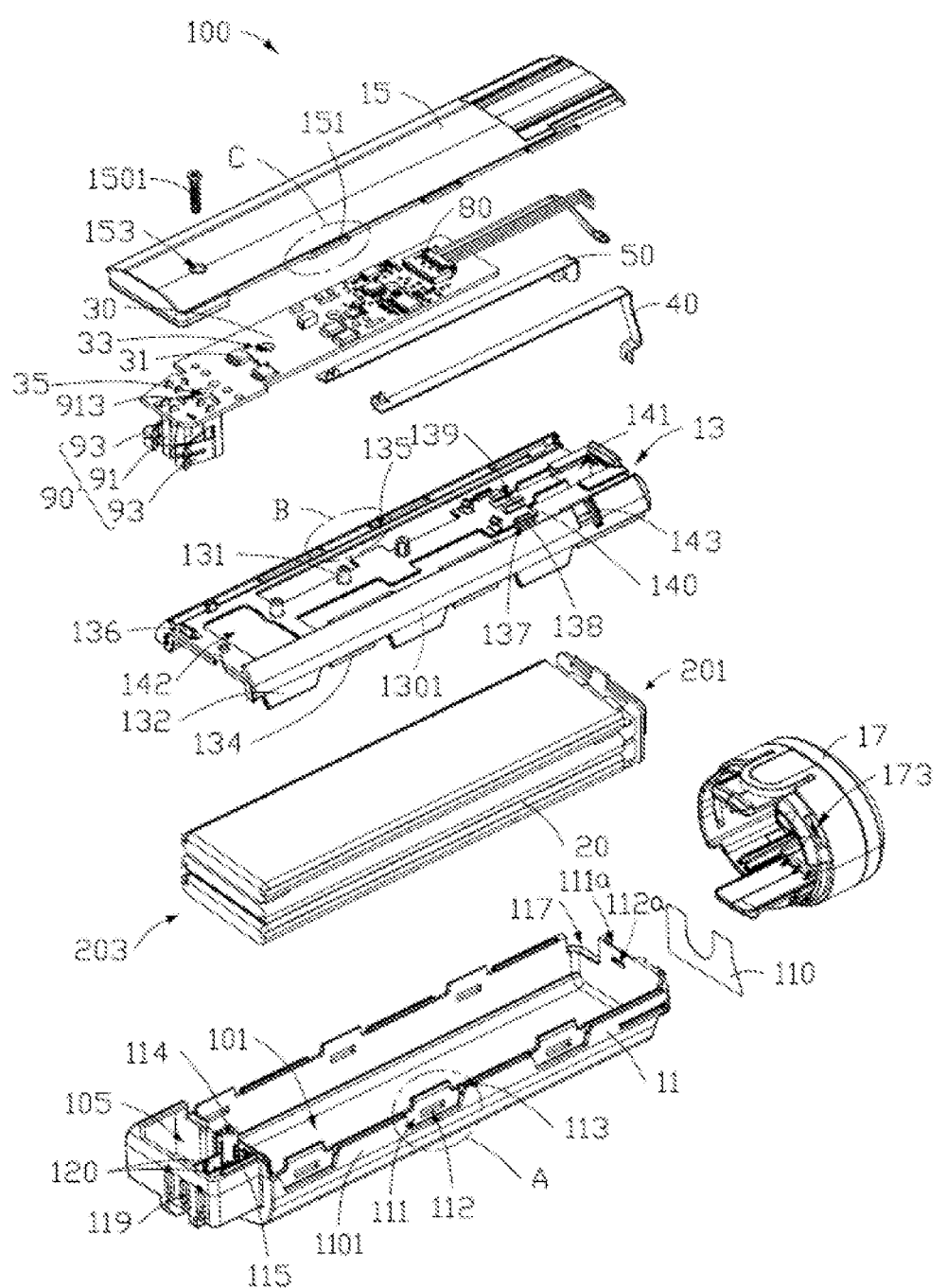
FIG. 3 is a schematic exploded view of a structure of the battery shown in FIG. 1.

Referring to FIG. 1, FIG. 2, and FIG. 3 together, an embodiment of this application discloses a battery 100, configured to provide electrical energy for an electric tool (not shown in the drawing). For example, the electric tool may be a vacuum cleaner, an electric drill, or a lighting tool. The battery 100 includes a shell 10, a cell module 20, and a circuit board 30. The shell 10 includes a first housing 11, a second housing 13, and a third housing 15. The second housing 13 and the first housing 11 close in to form a first cavity 101. The cell module 20 includes a plurality of stacked cells 25. The cell module 20 is disposed in the first cavity 101. The third housing 15 and the second housing 13 close in to form a second cavity 103. The circuit board 30 is disposed in the second cavity 103, and is electrically connected to the cell module 20. The circuit board 30 is provided with a battery management system (BATTERY MANAGEMENT SYSTEM). In this embodiment, the cell module 20 is a pouch-type cell structure. Along a stacking direction of the cells 25, the second housing 13 isolates the cell module 20 from the circuit board 30. In the battery 100, the cell module 20 and the circuit board 30 are disposed in the first cavity 101 and the second cavity 103 respectively, where the two cavities are located on two sides of the second housing 13 respectively. The second housing 13 isolates the circuit board 30 from the cell module 20 in the stacking direction of the cells 25, thereby thermally separating the first cavity 101 from the second cavity 103 effectively, and reducing mutual impact between the cell module 20 and the circuit board 30 caused by heat generated during operation.

The cell module 20 is bonded by adhesive to, but without limitation, an inner wall of the first housing 11 located in the first cavity 101. For example, in other embodiments, the cell module 20 may be bonded and fixed in the first cavity 101 by using other glues, or may be fixed in the first cavity 101 by abutting against the inner wall of the first housing 11 and the second housing 13 that are located in the first cavity 101. On the outer side of the cell module 20, the first cavity 101 may be filled with a shock-proof filler to improve shock-proof performance of the battery 100.

Referring to FIG. 2 and FIG. 3 together, a pillar 131 is disposed on the second housing 13. The pillar 131 protrudes from a side that is of the circuit board 30 and that faces the third housing 15, so as to prevent the third housing 15 from damaging the electronic component 31 on the circuit board 30 when the third housing 15 deforms and presses against the electronic component 31. In an embodiment, a hole structure 33 that allows passage of the pillar 131 may be disposed in the circuit board 30 to let the pillar 131 pass through the circuit board 30. In another embodiment, the pillar 131 may be disposed on one side of the circuit board 30 without passing through the circuit board 30, so as to stop the third housing 15. Preferably, an end that is of the pillar 131 and back from the second housing 13 abuts against the third housing 15 to improve reliability of stopping the third housing 15 from deforming and interfering with the electronic component 31 on the circuit board 30. Understandably, in other embodiments, the pillar 131 may be omitted, and the strength of the third housing 15 is increased to prevent the third housing 15 from deforming and pressing against the electronic component 31 on the circuit board 30.

Figure 4:
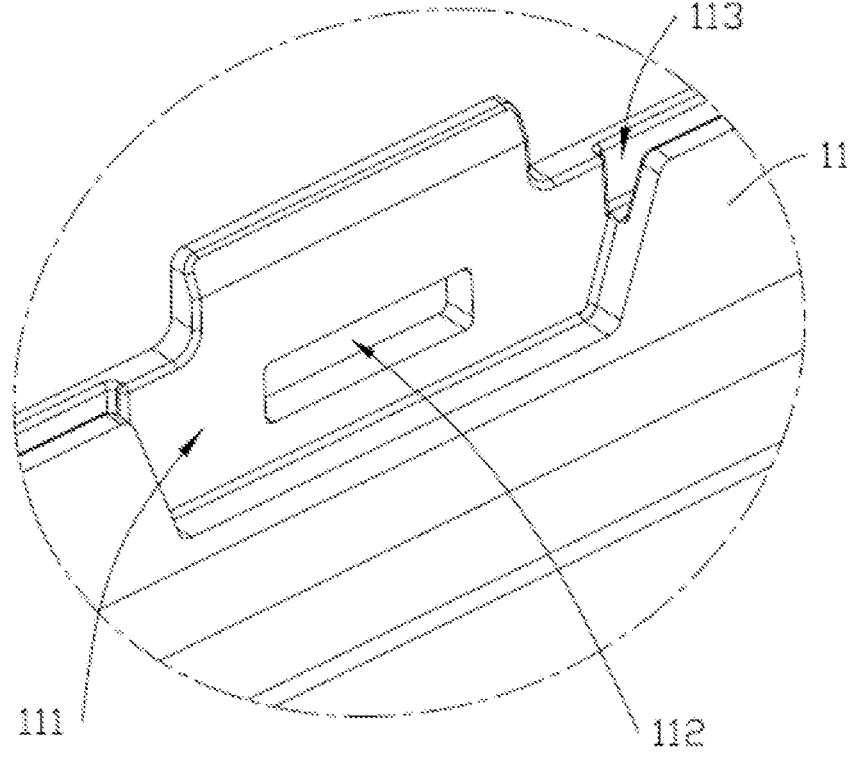
FIG. 4 is a schematic local detailed view of a position A in the battery shown in FIG. 3.
Figure 5:
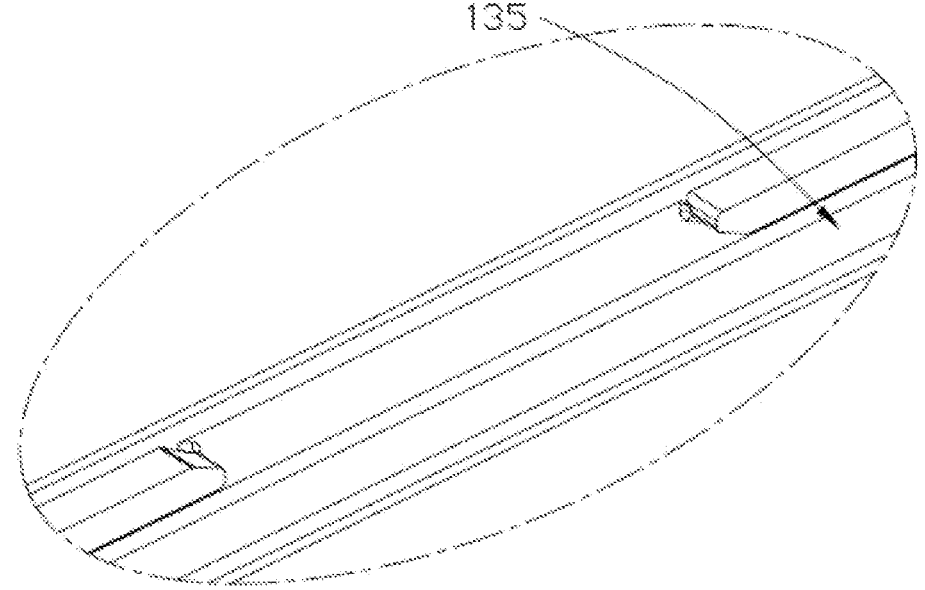
FIG. 5 is a schematic local detailed view of a position B in the battery shown in FIG. 3.
Figure 6:
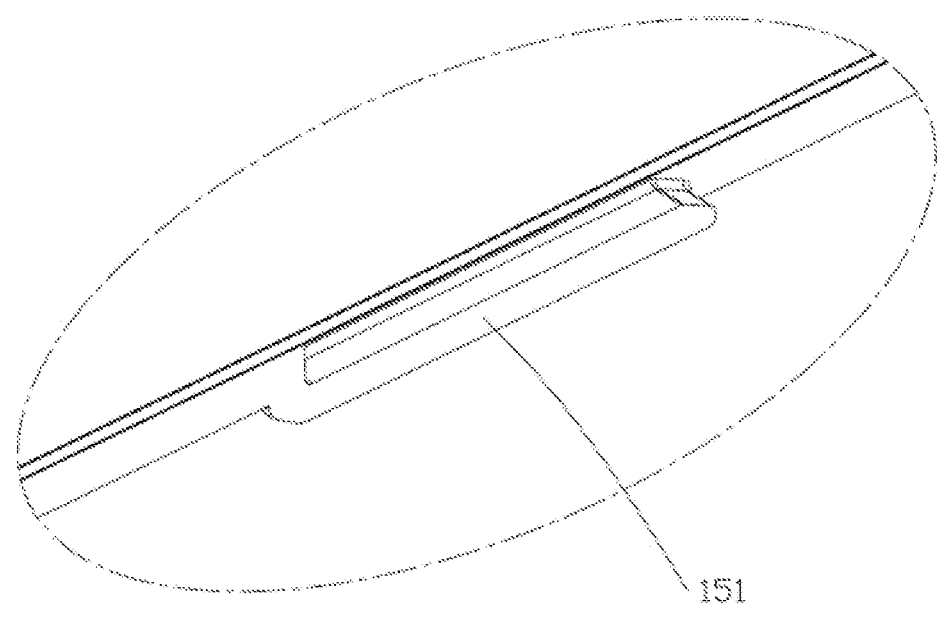
FIG. 6 is a schematic local detailed view of a position C in the battery shown in FIG. 3.
Figure 7:
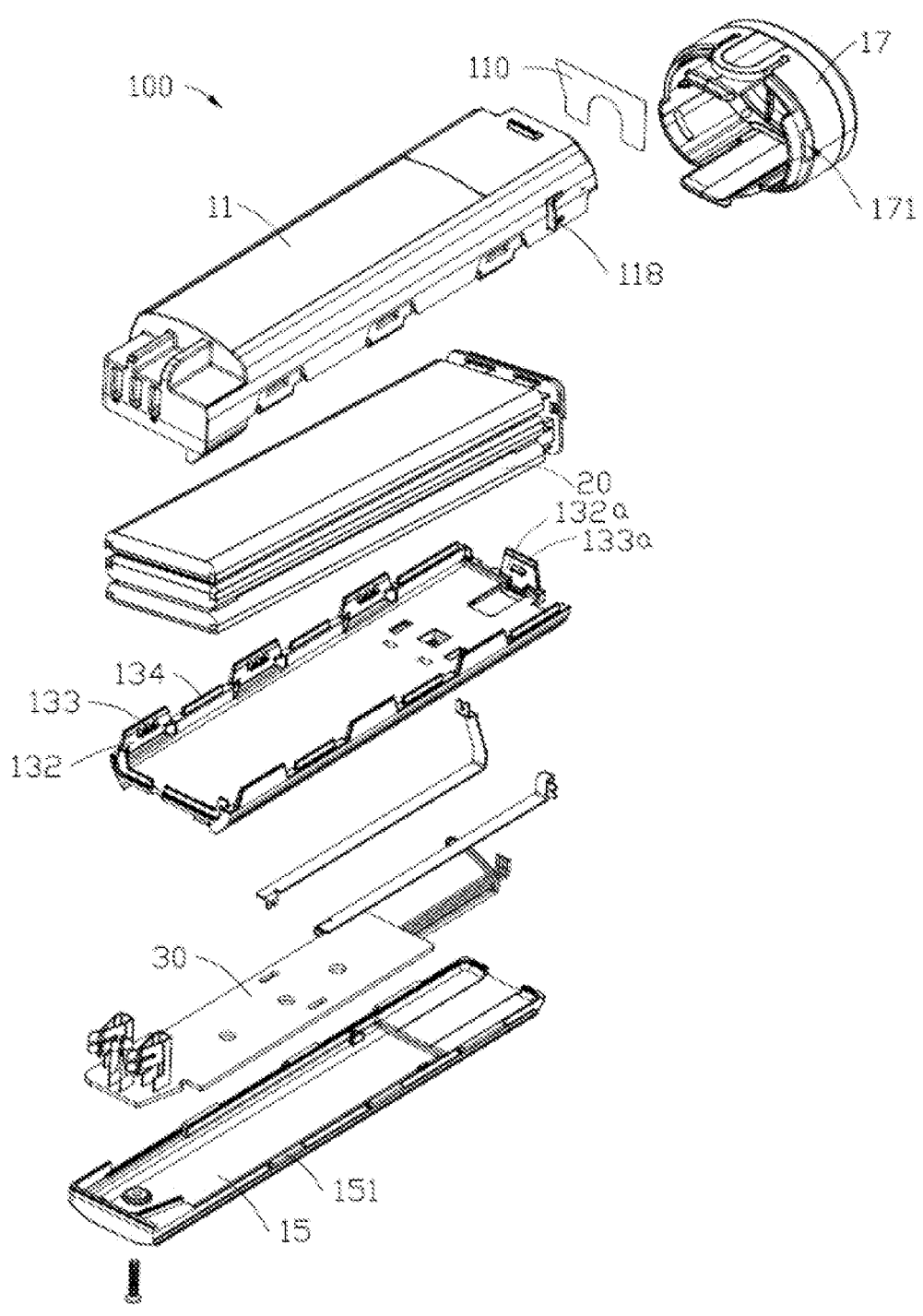
FIG. 7 is a schematic exploded view of a structure of the battery shown in FIG. 3 from another viewing angle.

Referring to FIG. 3, FIG. 4, and FIG. 7 together, the first housing 11 the second housing 13, and the third housing 15 are disposed in tandem along the stacking direction of the cells 25. The first housing 11 is fixed and connected to the second housing 13 in a snap-fit manner. The first housing 11 includes a first sidewall 1101. The second housing 13 includes a second a sidewall 1301. A first fixing structure is disposed between the first sidewall 1101 and the second sidewall 1301. The first fixing structure includes a guiding groove 111, a guiding portion 132, a snap buckle 133, and a buckle hole 112. The guiding portion 132 is configured to be embedded into the guiding groove 111. The snap buckle 133 can be snap-fitted into the buckle hole 112. Specifically, the first housing 11 includes two opposite first sidewalls 1101. A part of each first sidewall 1101 is recessed to form three guiding grooves 111, but this application is not limited thereto. The second housing 13 includes two second sidewalls 1301 disposed opposite to each other. Each of the second sidewalls 1301 extends outward to form three guiding portions 132. Each of the guiding portions 132 can slide along a corresponding guiding groove 111 and be embedded into the guiding groove 111. The guiding groove 111 and the guiding portion 132 improve the close-fitting effect between the first housing 11 and the second housing 13, and implement initial positioning of the first housing 11 and the second housing 13. A protruding snap buckle 133 is disposed on the guiding portion 132 toward the inner side of the first cavity 101. The buckle hole 112 is disposed on the wall of the guiding groove 111. The snap buckle 133 is snap-fitted in the buckle hole 112. The snap buckle 133 is stopped by the wall of the buckle hole 112 to restrict the guiding portion 132 from sliding along the guiding groove 111, so as to fix the first housing 11 and the second housing 13.

The guiding portion 132 and the guiding groove 111 may be, but is not limited to, quasi-trapezoidal. For example, in other embodiments, the guiding portion 132 and the guiding groove 111 may be rectangular, triangular, or arc-shaped.

The guiding portion 132 is located on a side that is of the guiding groove 111 and that faces back from the first cavity 101. The buckle hole 112 runs through the sidewall of the first housing 11. When being embedded into the guiding groove 111, the guiding portion 132 covers the buckle hole 112 to prevent foreign matters, liquid, and the like from entering the first cavity 101 through the buckle hole 112. Understandably, in other embodiments, the guiding portion 132 may be located on a side that is of the guiding groove 111 and faces the first cavity 101. By increasing the thickness of the sidewall of the first housing 11, the buckle hole 112 avoids running through the sidewall of the first housing 11.

Understandably, in other embodiments, the guiding portion 132 may be disposed on the first housing 11, and the guiding groove 111 may be disposed on the second housing 13, as long as the guiding portion 132 can slide along the guiding groove 111 to implement close fitting between the first housing 11 and the second housing 13.

Understandably, in other embodiments, the snap buckle 133 may be disposed on the wall of the guiding groove 111, and the buckle hole 112 may be disposed on the guiding portion 132, as long as the snap buckle 133 is snap-fitted into the button hole 112 to implement fixed connection between the first housing 11 and the second housing 13.

Referring to FIG. 3 and FIG. 4 together, a second fixing structure is further disposed between the first sidewall 1101 and the second sidewall 1301. The second fixing structure includes a slot 113 and a clasping portion 134. The slot 113 is disposed on the first sidewall 1101 of the first housing 11. The clasping portion 134 is formed by extending a part of the second sidewall 1301 of the second housing 13 outward. The clasping portion 134 can extend into the slot 113 and is stopped by two opposite walls of the slot 113, thereby further improving the strength of connection between the first housing 11 and the second housing 13. Understandably, in other embodiments, the slot 113 and the clasping portion 134 are omissible. Understandably, in another embodiment, the slot 113 may be disposed on the second housing 13, and the clasping portion 134 may be disposed on the first housing 11.

Referring to FIG. 2, FIG. 5, FIG. 6, and FIG. 7 together, the second housing 13 and the third housing 15 are connected by sliding and are fixed by a single fastener. Specifically, a plurality of spaced sliding grooves 135 are disposed on the second housing 13. A plurality of sliding portions 151 are disposed on the third housing 15. The sliding portions 151 can enter a gap between two adjacent sliding slots 135, and can be embedded into the sliding slots 135 from one end of the sliding slots 135, and can slide along the sliding slots 135 to implement initial positioning of the second housing 13 and the third housing 15. The first housing 11 is provided with a connecting hole 114. Specifically, the first housing 11 is provided with a protruding portion 115. The connecting hole 114 is disposed on the protruding portion 115. The third housing 15 is provided with a third via hole 153. The circuit board 30 is provided with a fourth via hole 35. A fastener 1501 sequentially passes through the third via hole 153 and the fourth via hole 35, and is connected to the connecting hole 114 to restrict the sliding portion 151 from moving along the sliding slot 135, so that the first housing 11 is connected and fixed to the third housing 15.

Understandably, in other embodiments, the protruding portion 115 is omissible. Alternatively, the connecting hole 114 may be directly disposed on the bottom wall of the first housing 11 or disposed on the second housing 13. The third housing 15 can be fixed with respect to the first housing 11 and the second housing 13 as long as the third housing 15 is held down and fixed onto the second housing 13 by connecting the fastener 1501 to the connecting hole 114.

Understandably, in other embodiments, the number of the slot 135 and the number of the sliding portion 151 may be both one. The sliding slot 135 may be disposed on the third housing 15, and the sliding portion 151 may be disposed on the second housing 13.

The first housing 11 may be connected and fixed to the second housing 13 by snap-fitting, the second housing 13 and the third housing 15 may be connected by sliding and are fixed by a single fastener, thereby reducing the number of fasteners and the time required to implement fastening. Understandably, in other embodiments, the connection between the first housing 11, the second housing 13, and the third housing 15 may be implemented by other means, for example, by being fastened with screws.

Figure 9:
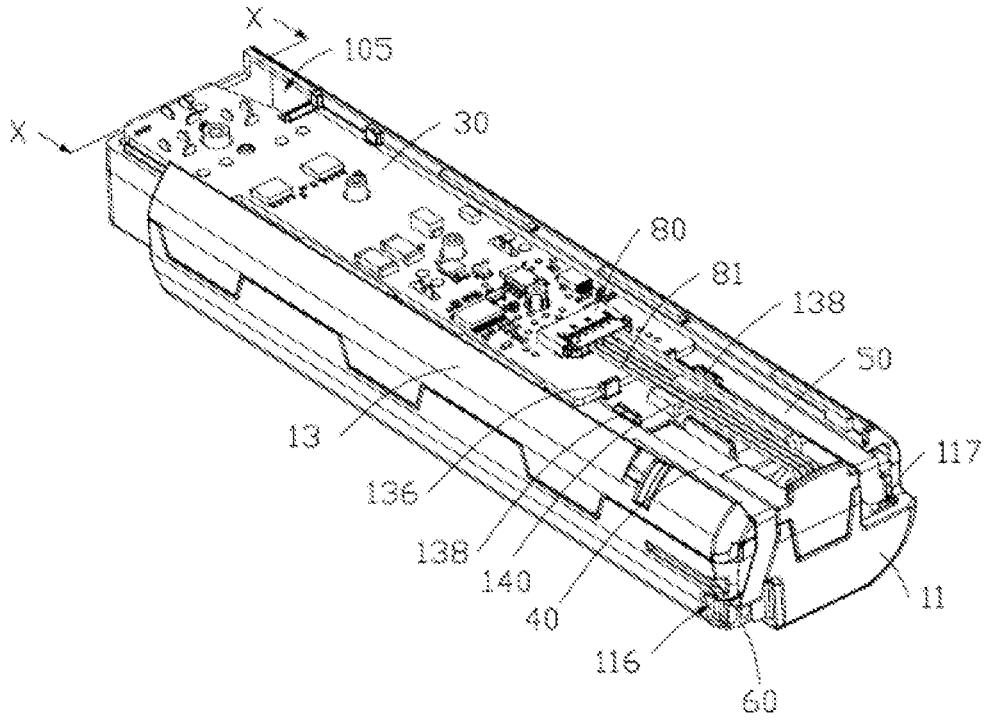
FIG. 9 is a schematic structural diagram of the battery shown in FIG. 8 after a third housing is removed.

Referring to FIG. 9, a plurality of first press-down portions 136 are disposed on the second housing 13. The first press-down portions 136 are configured to be clasped onto the circuit board 30. Understandably, in other embodiments, the third housing 15 may press the circuit board 30 on the second housing 13 to fix the circuit board 30 into the second cavity 103.

Referring to FIG. 3 and FIG. 9 together, the cell module 20 includes a first side 201 and a second side 203 that are opposite to each other. The cell module 20 is provided with two tabs (not shown in the drawing) of opposite polarities on the first side 201. The two tabs are a first tab (not shown in the drawing) and a second tab (not shown in the drawing) respectively. The battery 100 further includes a charge-discharge port 90 located on the second side 203 of the cell module 20. The battery 100 further includes a first connecting piece 40 and a second connecting piece 50. One end of the first connecting piece 40 is in contact with and connected to the circuit board 30, and the other end is electrically connected to the first tab. One end of the second connecting piece 50 is in contact with and connected to the circuit board 30, and the other end is electrically connected to the second tab. Both the first connecting piece 40 and the second connecting piece 50 may be, but are not limited to, copper bar structures. Alternatively, the first connecting piece 40 and the second connecting piece 50 may be other electrical connection structures, as long as the structures can implement electrical connection from the circuit board 30 to the first tab and the second tab separately.

The second housing 13 is provided with two accommodation grooves 137 and a plurality of second press-down portions 138. The two accommodation grooves 137 are configured to accommodate the first connecting piece 40 and the second connecting piece 50 respectively. Every two second press-down portions 138 are disposed on two sides of the accommodation groove 137 respectively, and are configured to press and fix the first connecting piece 40 and the second connecting piece 50.

Referring to FIG. 2, a plurality of the cells 25 in the cell module 20 are connected in series or in parallel to form the cell module 20, and form a main positive electrode and a main negative electrode. The first tab is a main positive electrode, and the second tab is a main negative electrode, but this application is not limited thereto. In other embodiments, the first tab may be a main negative electrode, and the second tab may be a main positive electrode. Foam 27 is disposed between two adjacent cells 25 to provide an expansion space for the cell module 20. Understandably, in other embodiments, the foam 27 is omissible.

Figure 10:
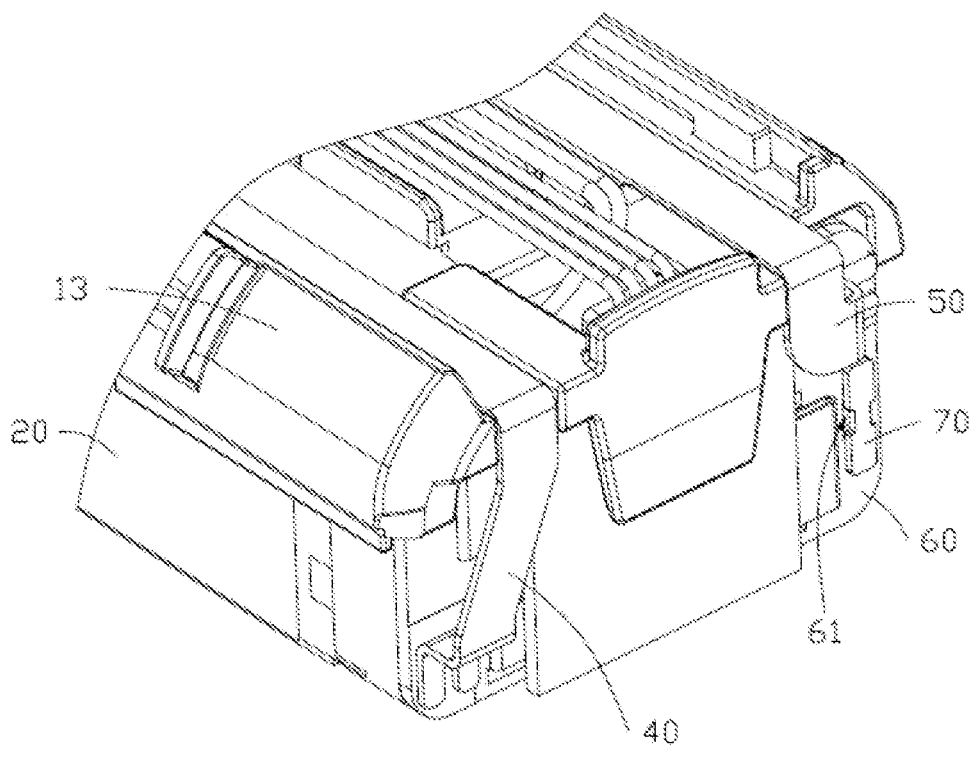
FIG. 10 is a schematic local structural diagram of the battery shown in FIG. 9 after a first housing is removed.

Still referring to FIG. 9 and FIG. 10, the battery 100 further includes an adapter plate 60 located on the first side 201 of the cell module 20. The first tab and the second tab of the cell module 20 are welded onto the adapter plate 60 separately. One end of the first connecting piece 40 and one end of the second connecting piece 50 are disposed on the adapter plate 60 separately. A line layer (not shown in the drawing) is disposed on the circuit board 30 to electrically connect the first tab to the first connecting piece 40, and electrically connect the second tab to the second connecting piece 50. The adapter plate 60 is located in the first cavity 101. A first via hole 116 and a second via hole 117 are disposed on a sidewall of the first housing 11, where the sidewall is located on a side on which the adapter plate 60 is disposed. An end that is of the first connecting piece 40 and back from the circuit board 30 extends out of the first cavity 101, and is connected to the adapter plate 60 through the first via hole 116. An end that is of the second connecting piece 50 and back from the circuit board 30 extends out of the first cavity 101, and is connected to the adapter plate 60 through the second via hole 117.

The first housing 11 effectively prevents a non-connected region from contacting the adapter plate 60, where the non-connected region is a non-connected region between the first connecting piece 40 and the adapter plate 60, and is a non-connected region between the second connecting piece 50 and the adapter plate 60. Understandably, in other embodiments, the first via hole 116 and the second via hole 117 are also omissible, and an insulation structure may be disposed in the non-connected region between the first connecting piece 40 and the adapter plate 60, and in the non-connected region between the second connecting piece 50 and the adapter plate 60, so as to avoid problems such as a short circuit caused by the contact with the adapter plate 60.

Referring to FIG. 10, the battery 100 further includes a protective piece 70. The protective piece 70 is disposed on the adapter plate 60, and is serially connected on a loop of electrical connection of the first connecting piece 40, the first tab, the second connecting piece 50, and the second tab. The protective piece 70 can fuse off when reaching a preset temperature. For example, when the loop is short-circuited, the temperature rises to the preset temperature, and the protective piece 70 fuses off to cut off the loop, thereby protecting the cell module 20 and the circuit board 30.

The adapter plate 60 is provided with a groove 61. Two ends of the protective piece 70 are connected to two sides of the groove 61 on the adapter plate 60 respectively. The groove 61 improves heat dissipation effects of the protective piece 70, and reduces impact caused by the temperature of the protective piece 70 onto the adapter plate 60. Understandably, in other embodiments, the groove 61 is omissible, and an insulation portion (not shown in the drawing) is disposed on the circuit board 30 to avoid a short circuit caused by direct electrical connection between the two ends of the protective piece 70.

Referring to FIG. 3 and FIG. 9 together, the battery 100 further includes a collecting piece 80 located in the second cavity 103. One end of the collecting piece 80 is connected to the circuit board 30, and the other end is connected to the cell module 20. Specifically, the two ends are connected onto the circuit board 30 and the adapter plate 60 respectively, and are configured to collect information on the first tab and the second tab. For example, the collecting piece 80 may collect information such as voltage and temperature of the first tab and the second tab.

The second housing 13 is provided with a cable trough 139 and a third press-down portion 140. The cable trough 139 is configured to facilitate the wiring of a wire harness 81 of the collecting piece 80. The two press-down portions are disposed on two sides of the cable trough 139 respectively, and can be elastically clasped outside the wire harness 81 of the collecting piece 80 to fix the wire harness 81.

The second housing 13 isolates the cell module 20 from the circuit board 30 to form non-closed isolation. Specifically, a channel 141 is disposed on the second housing 13. The channel 141 makes the first cavity 101 communicate with the second cavity 103. The channel 141 is close to the adapter plate 60 located on the first side 201 of the cell module 20. An end that is of the collecting piece 80 and back from the circuit board 30 extends into the first cavity 101 through the channel 141, and is connected to the adapter plate 60, so as to implement electrical connection of the collecting piece 80, the circuit board 30, and the adapter plate 60.

Understandably, in other embodiments, the channel 141 is omissible, and the collecting piece 80 may protrude out of the second cavity 103 and enter the first cavity 101 through the first via hole 116 or the second via hole 117 on the first housing 11 to connect to the adapter plate 60.

Referring to FIG. 3 and FIG. 7 together, a side that is of the circuit board 30 and back from the second housing 13 is configured to arrange an electronic component 31. The electronic component 31 is disposed on a single side of the circuit board 30 to improve space utilization of the second cavity 103. Understandably, in other embodiments, the electronic component 31 may be disposed on both sides of the circuit board 30. At least one heat dissipation slot 142 corresponding to the electronic component 31 is disposed toward the circuit board 30 on the second housing 13. For example, a heat dissipation slot 142 corresponding to an electronic component 31 that emits a relatively amount of heat on the circuit board 30 is provided on the second housing 13 to improve heat dissipation of the circuit board 30 and improve thermal isolation effects of the second housing 13 against the circuit board 30 and the cell module 20.

Referring to FIG. 1, FIG. 2, and FIG. 3 together, the shell 10 further includes an end cover 17. The end cover 17 is located on the first side 201 of the cell module 20. The end cover 17 forms a sleeve outside the first housing 11, the second housing 13, and the third housing 15 to close off the first cavity 101 and the second cavity 103 that correspond to the first side 201 of the cell module 20. The end cover 17 is connected to the first housing 11 and the second housing 13 separately in a snap-fit manner. A first snap hole 171 and a second snap hole 173 are disposed on a peripheral wall of the end cover 17. A first snap-fit portion 118 is disposed on an outer peripheral wall of the first housing 11. A second snap-fit portion 143 is disposed on an outer peripheral wall of the second housing 13. The first snap-fit portion 118 can be snap-fitted into the first snap hole 171, and the second snap-fit portion 143 can be snap-fitted into the second snap hole 173 to implement relative fixing between the end cover 17, the first housing 11, and the second housing 13.

Understandably, in other embodiments, the first snap hole 171 or the second snap hole 173 is omissible. Correspondingly, the first snap-fit portion 118 or the second snap-fit portion 143 is also omissible. In another embodiment, the end cover 17 may be connected onto the first housing 11, the second housing 13, or the third housing 15 by screws.

Referring to FIG. 3 and FIG. 7, the battery 100 further includes an insulation strip 110. The insulation strip 110 is configured to cover the first connecting piece 40 and the second connecting piece 50. Understandably, in other embodiments, the insulation strip 110 is omissible.

Figure 11:
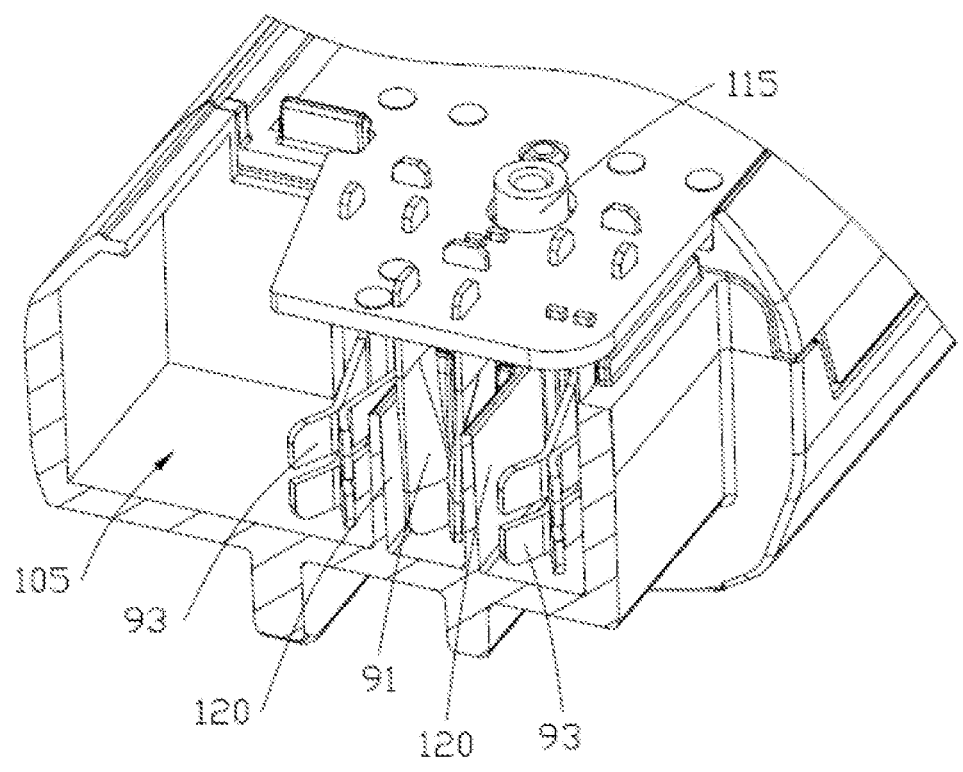
FIG. 11 is a schematic structural sectional view of the battery shown in FIG. 9 sectioned along an X-X line.
Figure 12:
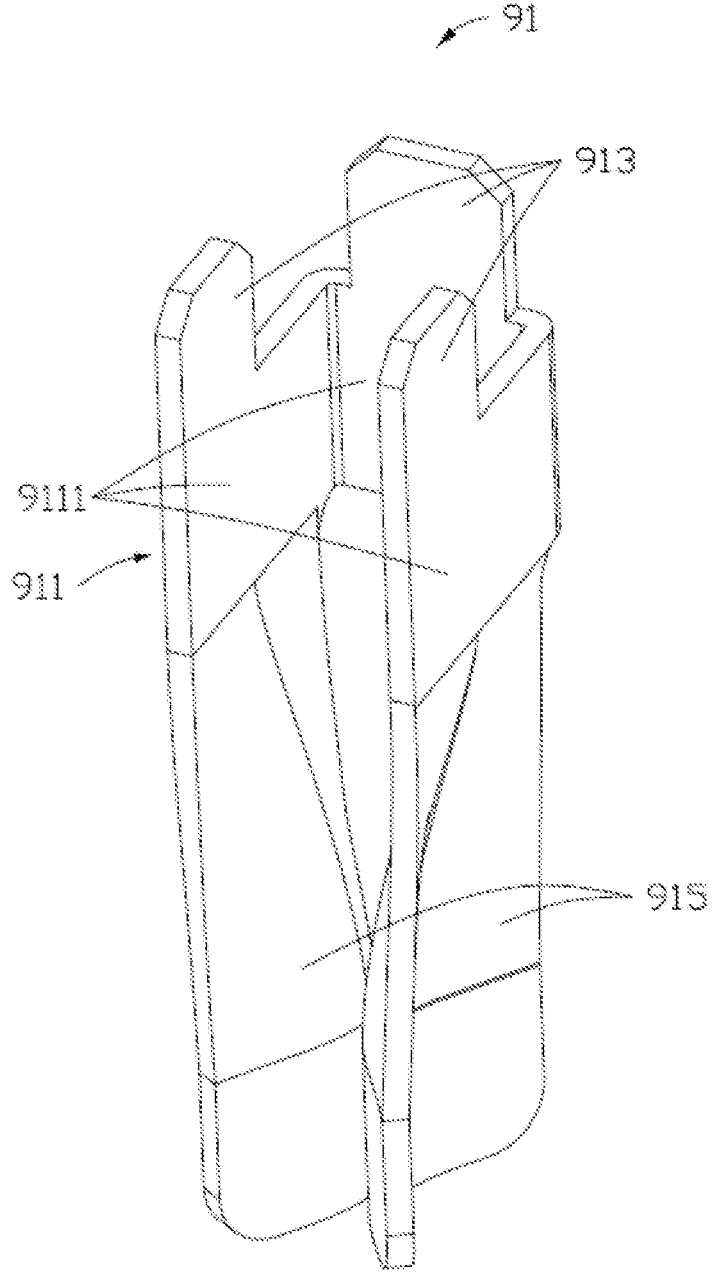
FIG. 12 is a schematic structural diagram of a first terminal in the battery shown in FIG. 11.

Referring to FIG. 2, FIG. 11, and FIG. 12 together, the charge-discharge port 90 includes terminals connected to the circuit board 30. The terminals include a first terminal 91 and two second terminals 93. The first terminal 91 is located between the two second terminals 93. The first housing 11 is provided with a third cavity 105. The third cavity 105 is isolated from the first cavity 101, and communicates with the second cavity 103. In this way, the first terminal 91 and the two second terminals 93 can be connected to the circuit board 30 separately. Two partition plates 120 are disposed in the third cavity 105. The partition plates 120 are located between the first terminal 91 and the second terminal 93. The partition plates 120 effectively prevent a short circuit and implement electrical spark blocking.

The protruding portion 115 is located in the third cavity 105 and located between the two partition plates 120. The protruding portion 115 occupies a part of space that is configured to accommodate the first terminal 91 in the third cavity 105, so that the space layout of the battery 100 is compact. For this reason, the size of the first terminal 91 is smaller than that of the second terminal 93. Specifically, the first terminal 91 includes a main body 911, three pin portions 913, and two receptacle portions 915. The main body 911 is a U-shaped plate structure that includes three lateral faces 9111. The three pin portions 913 are disposed on the three lateral faces 9111 of the main body 911 respectively, and are configured to connect onto the circuit board 30 separately. The first terminal 91 is connected to the circuit board 30 by the pin portions 913 connected onto the three sides 9111 of the U-shaped plate structure, thereby improving connection stability. The two receptacle portions 915 are disposed on two opposite lateral faces 9111 of the main body 911 respectively, and extend toward each other to at least partly abut against each other.

The first housing 11 is provided with three openings 119. The three openings 119 correspond to the first terminal 91 and the two second terminals 93 respectively. In this way, components that require electrical energy from the battery 100 can be electrically connected to the charge-discharge port 90 through the openings 119.

Figure 8:
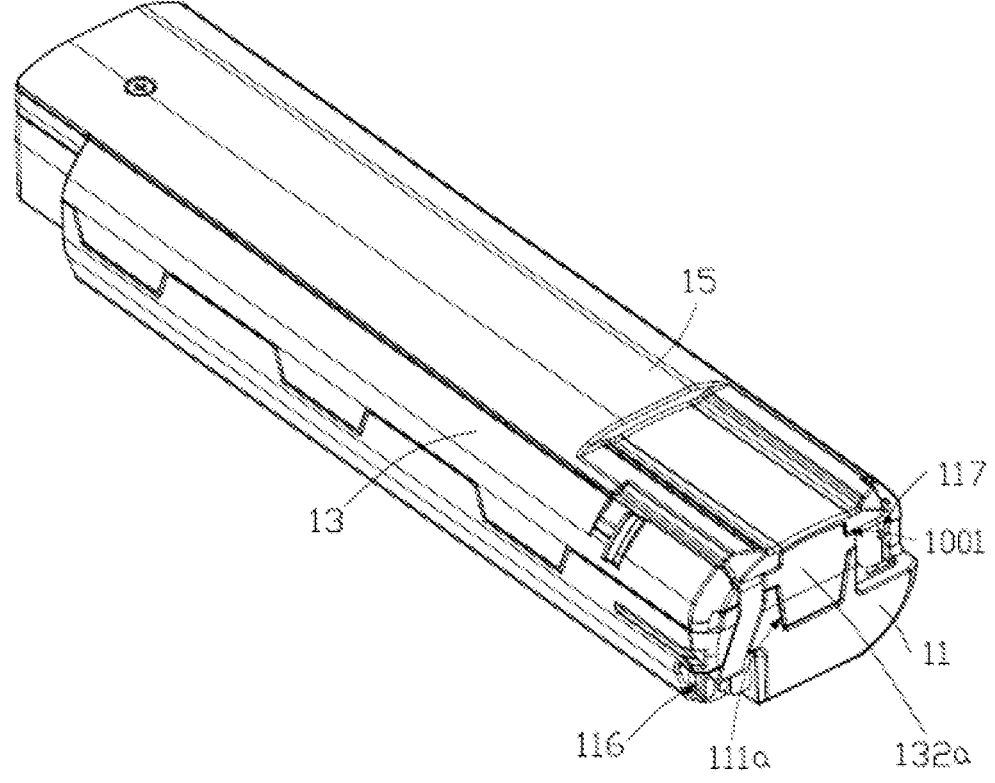
FIG. 8 is a schematic structural diagram of the battery shown in FIG. 1 after an end cover and an insulation strip are removed.

Referring to FIG. 3, FIG. 7, and FIG. 8 together, the first housing 11, the second housing 13, and the third housing 15 are connected and fixed in tandem. A gap 1001 configured to extend the first connecting piece 40 and the second connecting piece 50 from the second cavity 103 as well as the first via hole 116 and the second via hole 117 configured to lead the connecting pieces into the first cavity 101 are reserved on the first side 201 of the cell module 20. The opening 119 configured to communicate with the charge-discharge port 90 is reserved on the second side 203 of the cell module 20.

Specifically, an extended guiding portion 132*a* is disposed on the first side 201 of the cell module 20 in the second housing 13. The guiding portion 132*a* is provided with a snap buckle 133*a*. A guiding groove 111*a* is disposed on the first side 201 of the cell module 20 in the first housing 11. A buckle hole 112*a* is disposed on the wall of the guiding groove 111*a*. The guiding portion 132*a* can be embedded into the guiding groove 111*a*, and the guiding portion 132*a* covers the buckle hole 112*a*. In this way, the first cavity 101 communicates with the outside of the first housing 11 through merely the first via hole 116 and the second via hole 117. The snap buckle 133*a* can be snap-fitted into the buckle hole 112*a*, thereby further improving the strength of connection between the second housing 13 and the first housing 11.

When the third housing 15 is connected onto the second housing 13, the two gaps 1001 are reserved between the third housing 15 and the second housing 13 on the first side 201 of the cell module 20. The first connecting piece 40 and the second connecting piece 50 can pass through the gaps 1001.

Understandably, in other embodiments, the gaps 1001 may be replaced with a hole disposed on the third housing 15.

Understandably, in other embodiments, the second housing 13 may also be provided with a hole that allows the first connecting piece 40 and the second connecting piece 50 to enter the first cavity 101 from the second cavity 103. In this way, the first connecting piece 40 electrically connected to the adapter plate 60 or electrically connected to the cell module 20, the second connecting piece 50 are electrically connected to the adapter plate 60 or electrically connected to the cell module 20. The first connecting piece 40 and the second connecting piece 50 do not need to extend out of the second cavity 103. The first housing 11, the second housing 13, and the third housing 15 close off the first cavity 101 and the second cavity 103 that are located on the first side 201 of the cell module 20. The end cover 17 is omissible.

In the foregoing battery 100, the cell module 20 and the circuit board 30 are disposed in the first cavity 101 and the second cavity 103 respectively, where the two cavities are located on two sides of the second housing 13 respectively.

The second housing 13 isolates the circuit board 30 from the cell module 20 in the stacking direction of the cells 25, thereby thermally separating the first cavity 101 from the second cavity 103 effectively, and reducing mutual impact between the cell module 20 and the circuit board 30 caused by heat generated during operation.

Further, the second housing 13 stops the cell module 20 to limit expansion of the cell module 20 and prevent the cell module 20 from expanding and squeezing the circuit board 30.

Further, the second housing 13 and the first housing 11 protect the cell module 20, avoid risks of other structures such as the circuit board 30 piercing the cell module 20, and avoid leakage of an electrolytic solution after the cell module 20 is pierced.

Further, the second housing 13 isolates the first cavity 101 from the second cavity 103 in a non-closed manner in the stacking direction of the cells 25. In the battery 100, the first cavity 101 communicates with the second cavity 103 merely in the position of the channel 141. The channel 141 occupies merely a small part of area of the second housing 13. Even if the electrolytic solution of the cell module 20 leaks out, the second housing 13 can reduce the impact caused by the leakage in the cell module 20 onto the circuit board 30.

The foregoing embodiments are merely intended for describing the technical solutions of this application but not intended as a limitation. Although this application is described in detail with reference to the foregoing optional embodiments, a person of ordinary skill in the art understands that modifications or equivalent substitutions may be made to the technical solutions of this application without departing from the spirit and conception of the technical solutions of this application.

I claim:

1. A battery, comprising:
   a shell comprising a first housing, a second housing, and a third housing;
   a cell module comprising a plurality of stacked cells;
   a circuit board, wherein the circuit board is electrically connected to the cell module;
   the second housing and the first housing close in to form a first cavity, and the first cavity is configured to accommodate the cell module; and
   the third housing and the second housing close in to form a second cavity, and the second cavity is configured to accommodate the circuit board; and
   along a stacking direction of the cells, the second housing isolates the cell module from the circuit board;
   wherein the battery comprises a charge-discharge port, the charge-discharge port comprises a terminal connected to the circuit board, the first housing is provided with a third cavity, the third cavity is isolated from the first cavity and communicates with the second cavity, and the terminal is accommodated in the third cavity;
   wherein the cell module further comprises two tabs of opposite polarities and disposed on a same side of the cells, and a first via hole and a second via hole are disposed on a sidewall of the first housing, wherein the sidewall is located on a side on which the tabs are disposed; and
   the battery further comprises a first connecting piece and a second connecting piece, one end of the first connecting piece is connected and fixed to the circuit board, and an other end of the first connecting piece is connected to the cell module through the first via hole; and, one end of the second connecting piece is connected and fixed to the circuit board, and an other end of the second connecting piece is connected to the cell module through the second via hole.

2. The battery according to claim 1, wherein the isolation is non-closed isolation, the battery comprises a collecting piece located in the second cavity, one end of the collecting piece is connected to the circuit board, and the other end is connected to the cell module.

3. The battery according to claim 2, wherein the shell further comprises a channel, and one end of the collecting piece is connected to the cell module through the channel.

4. The battery according to claim 1, wherein the terminal comprises a first terminal and two second terminals, the first terminal is located between the two second terminals, two partition plates are disposed in the third cavity, and the partition plates are located between the first terminal and one of the two second terminals.

5. The battery according to claim 4, wherein the battery comprises a fastener, the first housing comprises a protruding portion disposed between the two partition plates, a third via hole and a fourth via hole that fit with the protruding portion are disposed on the third housing and the circuit board respectively, and the fastener passes through the third via hole and the fourth via hole consecutively and is connected and fixed to the protruding portion.

6. The battery according to claim 4, wherein the first terminal comprises a main body, three pin portions, and two receptacle portions;

the main body is a U-shaped plate structure comprising three lateral faces;

the three pin portions are disposed on the three lateral faces of the main body respectively, and are configured to connect onto the circuit board separately; and the two receptacle portions are disposed on two opposite lateral faces of the main body respectively, and extend toward each other to at least partly abut against each other.

7. The battery according to claim 1, further comprising an adapter plate located in the first cavity; the two tabs are welded to the adapter plate separately, the first connecting piece is connected to the adapter plate through the first via hole, and the second connecting piece is connected to the adapter plate through the second via hole.

8. The battery according to claim 7, wherein the adapter plate and the charge-discharge port are disposed on two opposite sides of the cell module.

9. The battery according to claim 7, wherein the battery further comprises a protective piece; and a groove is provided on the adapter plate, and two ends of the protective piece are connected to two sides of the groove on the adapter plate respectively, and are serially connected on a loop of electrical connection of the first connecting piece, the two tabs, and the second connecting piece.

10. The battery according to claim 1, wherein the first housing, the second housing, and the third housing are arranged along the stacking direction of the cells.

11. The battery according to claim 1, wherein the housing further comprises an end cover, the end cover is located on a side of the cell module, the side on which the tabs are disposed;

and the end cover forms a sleeve outside the first housing, the second housing, and the third housing.

12. The battery according to claim 1, wherein the first housing comprises a first sidewall, the second housing comprises a second sidewall, a first fixing structure is disposed between the first sidewall and the second sidewall, and the first fixing structure comprises a guiding groove, a guiding portion, a snap buckle, and a buckle hole;

the guiding portion is configured to be embedded into the guiding groove; the guiding groove is disposed on one of the first sidewall or the second sidewall, and the guiding portion is disposed on the other of the first sidewall or the second sidewall; and the snap buckle is configured to be snap-fitted in the buckle hole, the snap buckle is disposed on one of the guiding portion or a wall of the guiding groove, and the buckle hole is disposed on the other of the guiding portion or the wall of the guiding groove.

13. The battery according to claim 1, wherein the battery comprises a pillar disposed on the second housing, the pillar protrudes from a side of the circuit board and faces the third housing;

the circuit board comprises a hole structure, the pillar passes through the hole structure.

14. The battery according to claim 7, wherein the second housing comprises a channel, the channel makes the first cavity communicate with the second cavity, the channel is close to the adapter plate located on the first side of the cell module, an end of the collecting piece and back from the circuit board extends into the first cavity through the channel, and the collecting piece is connected to the adapter plate.

15. The battery according to claim 1, wherein third housing is connected onto the second housing, the two gaps are reserved between the third housing and the second housing on the first side of the cell module, the first connecting piece and the second connecting piece are through the gaps.

16. The battery according to claim 7, wherein a part of the first connecting piece is disposed between the third housing and the adapter plate.

17. The battery according to claim 1, wherein the battery comprises an insulation strip, the insulation strip is configured to cover the first connecting piece and the second connecting piece.

18. The battery according to claim 1, the battery includes comprises a collecting piece located in the second cavity, the collecting piece is disposed between the first connecting piece and the second connecting piece.

* * * * *